United States Patent [19]

Matuska

[11] Patent Number: 4,629,644

[45] Date of Patent: Dec. 16, 1986

[54] FILAMENT WOUND STRUCTURE HAVING FILAMENT WOUND REINFORCING RINGS FOR USE AS A TORQUE DRIVE

[75] Inventor: David G. Matuska, Stratford, Conn.

[73] Assignee: United Technologies Corporation, Hartford, Conn.

[21] Appl. No.: 781,605

[22] Filed: Sep. 30, 1985

[51] Int. Cl.$^4$ .............................................. B64C 27/52
[52] U.S. Cl. .................................... 428/137; 428/238; 428/408; 428/431; 428/902; 416/134 A; 416/143; 416/159
[58] Field of Search ............... 428/137, 238, 408, 431, 428/902; 416/134 A, 143, 159

[56] References Cited

U.S. PATENT DOCUMENTS

| | | | |
|---|---|---|---|
| 4,156,583 | 5/1979 | Mayerjak | 416/208 |
| 4,168,194 | 9/1979 | Stiles | 156/166 |
| 4,257,835 | 3/1981 | Bompard | 156/92 |
| 4,305,903 | 12/1981 | Krause | 264/258 |
| 4,323,332 | 4/1982 | Fradenburgh | 416/134 |
| 4,341,840 | 7/1982 | Prewo | 428/408 |
| 4,451,528 | 5/1984 | Krause | 428/287 |
| 4,455,123 | 6/1984 | Sanders et al. | 416/134 A |
| 4,545,837 | 10/1985 | Wehnert et al. | 156/191 |
| 4,548,678 | 10/1985 | Laflin et al. | 162/746 |

FOREIGN PATENT DOCUMENTS 3026104 2/1982 Fed. Rep. of Germany .
8403679 9/1984 PCT Int'l Appl. .

Primary Examiner—John E. Kittle
Assistant Examiner—Patrick J. Ryan
Attorney, Agent, or Firm—A. Dean Olson; E. Richard Skula

[57] ABSTRACT

A filament wound fiber reinforced resin matrix composite structure. The structure is particularly adapted for use as a torque drive diaphragm in a rotary wing aircraft hub. The structure comprises a substantially flat diaphragm, a rim, rim reinforcement fibers and at least one fiber reinforcement ring. The diaphragm has a central attachment means for receiving a shaft and the rim has an attachment means. An alternative embodiment of the structure is a hollow disc having first and second substantially flat diaphragm sides with a connecting rim, rim reinforcement fibers and at least one fiber reinforcing ring for each diaphragm side. The sides have centrally located attachment means. The structure comprises a resin matrix, fibers wound substantially tangentially to the central attachment means with sufficient tension in a multiple circuit pattern to form the structure, fibers wound with sufficient tension in an essentially circumferential manner to reinforce the rim of the structure and fibers wound substantially circularly to form rings for reinforcing the diaphragm. The structure is cured by molding with sufficient heat and temperature in a controlled cure cycle. The structure does not exhibit "oil-canning" in that the flat diaphragm or diaphragm sides do not displace from the substantially flat uniplanar mode when subjected to varying temperatures. In addition, the structure does not buckle under heavy torque loading. The spring characteristics of the structure when constrained as a torque drive remain approximately linear and buckling and snap-through are eliminated during operation.

18 Claims, 14 Drawing Figures

FIG. 10A
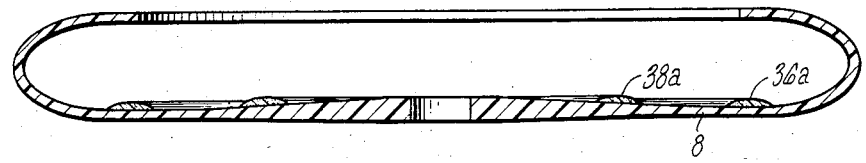
FIG. 10B
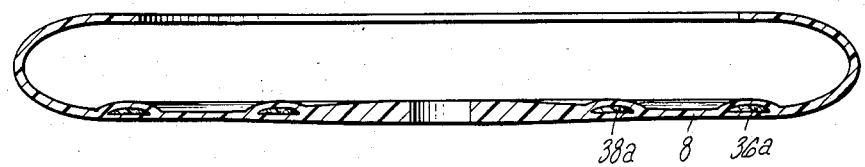
FIG. 10C
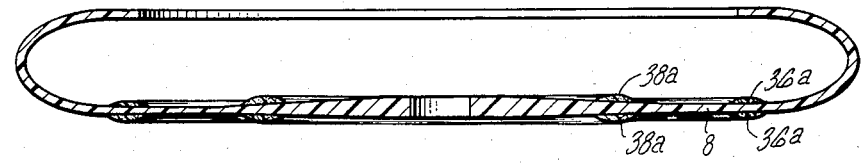
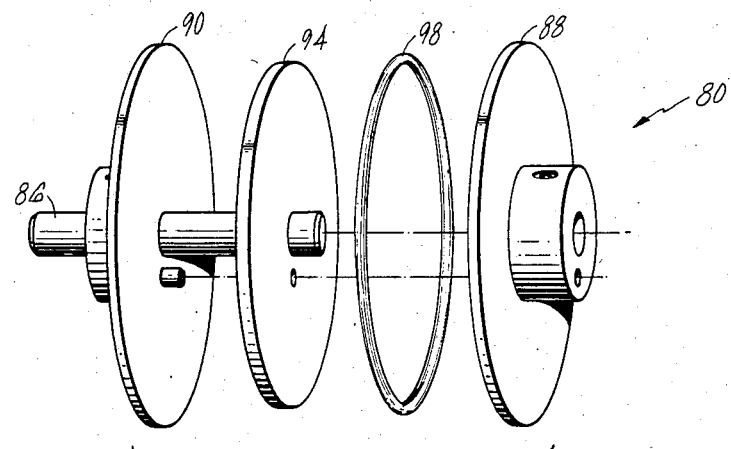
FIG. 11

FILAMENT WOUND STRUCTURE HAVING FILAMENT WOUND REINFORCING RINGS FOR USE AS A TORQUE DRIVE

CROSS REFERENCE TO RELATED APPLICATION

This application is related to copending U.S. application Ser. No. 734,982 filed May 16, 1985 disclosing a filament wound structure for use as a torque drive.

TECHNICAL FIELD

The field of art to which this invention relates is fiber reinforced resin matrix composites, more particularly to composite diaphragm structures.

BACKGROUND ART

In order to transfer energy from a turbine engine, a conventional combustion engine, an electric motor or any power generating apparatus to a machine to power the machine, it is typically necessary to join the power generating apparatus to the machine with some sort of coupling means. These apparatuses typically transmit power through an angularly rotating shaft and this power output is typically referred to as torque. The power coupling means is a critical piece of equipment since its failure will typically result in the de-energization of the machine.

When a power generating apparatus having a high horsepower output (e.g. a 1,000 H.P. electric motor) is coupled to a machine having a high angular velocity shaft (e.g., a centrifugal pump), it is critical that the shafts of the devices are aligned as closely as possible. Misalignment will result in a number of problems including adverse vibration levels, premature bearing failure, structural damage, overheating, excessive noise, and high wear rate and failure rate of the coupling. Although it is theoretically possible to perfectly align the shafts of the power generating apparatus and the machine, there are practical limitations including measurement equipment, equipment location, adverse environmental factors, differential rates of thermal expansion during operation, etc. In addition, the design may require a specified amount of articulation. There are couplings in the prior art which permit slight shaft misalignment for high torque, high speed applications, however, the amount of misalignment is typically about ¼° or less and these couplings are typically of metal construction and very heavy. The primary limitation of the power couplings of the prior art is that the materials of construction do not permit high torque and high angular velocity with large shaft misalignment, up to about 10°, across a broad temperature spectrum. Such a power coupling must act as a torque transmitting or driving means, and, it must also act as a flexure to permit elastic deformation to compensate for the misalignment.

The power coupling means is particularly crucial in rotary wing aircraft or helicopters. The power coupling means used in helicopters to transfer torque from the power shaft to the helicopter blades is typically referred to as a rotary hub. The rotary hubs of the prior art were complex, metal mechanisms. The disadvantages of these metal rotary hubs were several including weight, fatigue failure, very high maintenance and cost.

There is a constant search in this art to replace metal aircraft parts with lightweight, high strength, fatigue resistant composite components. An example of a helicopter gimbal rotor hub utilizing composite materials is contained in U.S. Pat. No. 4,323,332 which is incorporated by reference.

The elimination of conventional roller bearings and ball bearings in the rotor hub of a helicopter is accomplished in a composite gimbal rotor hub by utilizing composite materials in the blade and hub which are capable of bending and rotating to accommodate blade pitch, flap and lead-lag motion. The rotor hub restrains the blades against centrifugal force and transmits lifting force from the blades to the shaft and airframe of the helicopter. Since the rotary hub should tilt about the central axis of the shaft in a gimbal hub design, it is necessary to provide a tiltable or articulable means for transferring torque from the shaft to the rotor blades. The torque drive structure must be rigid enough to transmit torque directly from the shaft to the helicopter without buckling blades but yet must be sufficiently flexible and bendable to tilt up to approximately 10° from horizontal while transmitting the torque load.

Buckling of a torque drive structure is observed as a wave or series of waves induced in the structure in reaction to a torque load on the structure. Buckling is inherent in a flexible torque drive structure and is undesirable in that it is directly related to reduced fatigue life, reduced torque load capacity and dynamic instability of the torque drive structure. The typical power output to a helicopter hub assembly is in excess of 1,000 H.P. Conventional metal materials do not have the properties required to simultaneously perform the torque driving function and flexure function without buckling and/or structural failure.

Accordingly, what is needed in this art is a flexible composite torque transfer means and a method of manufacturing such a torque transfer means that overcomes the problems of the prior art.

DISCLOSURE OF THE INVENTION

A fiber reinforced resin matrix composite structure, particularly adapted for use as a torque drive diaphragm in a rotary wing aircraft hub, is disclosed. The structure comprises a circular diaphragm having a rim, said rim having an attachment means, and said diaphragm having at least one reinforcing ring and a central attachment means. The structure comprises a resin matrix, reinforcing fibers wound substantially tangentially to the central attachment means in a multiple circuit pattern to form a diaphragm section of the structure and a rim and a rim attachment means, and reinforcing fibers wound in an essentially circumferential manner to reinforce the rim of the structure, and reinforcing fibers wound in a substantially circular manner to form rings concentric with the center of the diaphragm. The structure is wound with sufficient fiber tension and cured by molding with sufficient heat and pressure. The diaphragm section of the structure remains essentially uniplanar when subjected to stresses induced by temperature changes, and the structure is resistant to buckling under torque loads.

Another aspect of this invention is a method of forming a fiber reinforced resin matrix composite structure comprising a diaphragm having a rim, a rim attachment means, reinforcing rings, and a central attachment means, particularly adapted for use as a torque drive diaphragm in rotary wing aircraft hub, comprising winding fiber impregnated with thermosetting resin at sufficient fiber tension on a mandrel substantially tangentially to the central attachment means in a multiple circuit pattern to form the diaphragm, a rim and rim attachment means, winding reinforcing fibers impregnated with resin at sufficient fiber tension in an essentially circumferential manner to reinforce the rim of the structure, wherein the reinforcing fibers are optionally interleaved with the tangential fibers to form the structure, and winding reinforcing fibers impregnated with resin in a substantially circular manner to form at least one reinforcing ring, the ring located concentrically on the diaphragm or within the diaphragm. The structure is then cured by molding at sufficient heat and pressure. The diaphragm section of the structure remains essentially uniplanar when subjected to stresses induced by temperature changes, and the structure is resistant to buckling under torque loads.

Another aspect of this invention is a fiber reinforced resin matrix composite structure, particularly adapted for use as a flexible torque drive coupling. The structure comprises a hollow disc having a first substantially flat diaphragm side and a second substantially flat diaphragm side, each diaphragm side having a central attachment means and each diaphragm side having at least one reinforcing ring concentric with the diaphragm sides. The disc has a peripheral rim joining the diaphragm sides. The structure comprises a resin matrix, fiber, wound with sufficient tension substantially tangentially to the central attachment means in a multiple circuit pattern to form the disc, fiber wound with sufficient tension in an essentially circumferential manner to reinforce the peripheral rim of the structure and fiber wound with sufficient tension in a substantially circular manner to form reinforcing rings on or in the diaphragm sides and concentric therewith. The structure is cured by molding with sufficient heat and pressure such that the diaphragm sections remain essentially uniplanar when subjected to stresses induced by temperature changes, and the structure is resistant to buckling under torque loads.

Yet another aspect of this invention is a method of forming a fiber reinforced resin matrix composite structure, particularly adapted for use as a flexible torque drive coupling. The method comprises winding fiber impregnated with resin on a mandrel substantially tangentially to at least one central attachment means with sufficient fiber tension using a multiple circuit pattern to form a disc having a first substantially flat diaphragm side and a second substantially flat diaphragm side said disc having a peripheral rim joining the diaphragm sides, wherein each diaphragm side has the central attachment means, winding reinforcing fibers impregnated with resin with sufficient tension in an essentially circumferential manner to reinforce the rim of the structure, wherein the reinforcing fibers are optionally interleaved with the tangential fibers to form the structure, and forming at least one reinforcing ring for each diaphragm side by winding fiber impregnated with resin in a substantially circular manner, said rings being concentrically located on each diaphragm side or optionally interleaved with the tangential fibers. The structure is then cured by molding at sufficient heat and pressure, thereby producing a structure such that the diaphragm sides of the disc remain essentially uniplanar when subjected to stresses induced by temperature changes, and the structure is resistant to buckling under torque loads.

The foregoing and other features and advantages of the present invention will become more apparent from the following description and accompanying drawings.

BRIEF DESCRIPTION OF THE DRAWINGS

FIG. 10B, FIG. 10B and FIG. 10C illustrate the reinforcing rings used in the torque drive structures of the present invention.

FIG. 11 illustrates a mandrel which may be used to wind the rinforcing rings of the present invention.

BEST MODE FOR CARRYING OUT THE INVENTION

Figure 1:
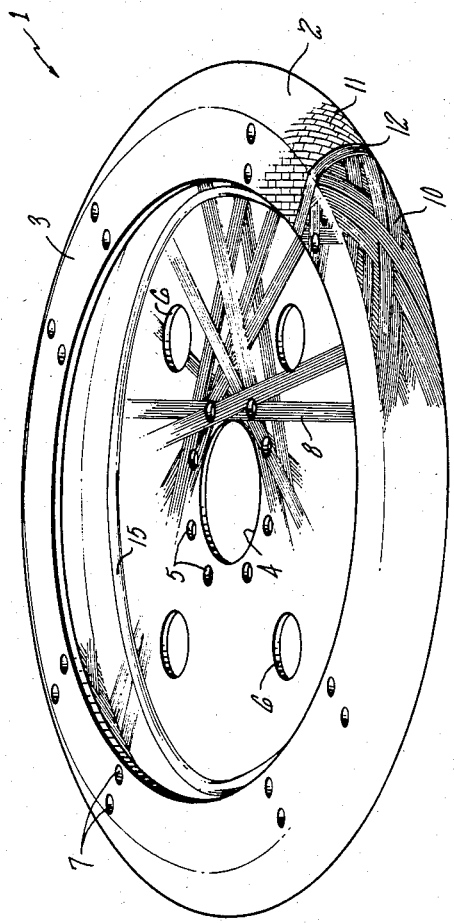
FIG. 1 shows a preferred embodiment of the fiber wound torque transmitting structure of the present invention.

The fibers which are used to manufacture the torque transmission structures of the present invention will comprise fibers known in the art for manufacturing composite structures. Some examples of these fibers include polyaramid fiber, graphite fiber, glass fiber, and combinations thereof. The fibers will typically have a tensile strength of about 70,000 to about 550,000 psi, preferably about 400,000 psi. A particularly preferred synthetic fiber in the practice of this invention is Kevlar 29 ® brand polyaramid fiber manufactured by DuPont Company, Wilmington, Del. Kevlar 29 ® brand polyaramid fiber has a tensile strength of about 400,000 psi and a tensile modulus of 9,000,000 psi. The fiber is typically purchased in the form of commercially available prefabricated roving or tape. Tape will typically comprise about 8 rovings. The tape used to wind the structures of the present invention is typically about 0.5 inch to about 12 inches in width, more typically about 0.5 inch to about 6 inches, although any conventional width may be used. The preferred width of tape used in winding a structure will depend upon and vary with the size of the structure. The thickness of the tape is typically about 0.050 inch to about 0.002 inch, more typically about 0.012 inch to about 0.006 inch and preferably about 0.006 inch.

It is preferred to use polyaramid tape which has been preimpregnated with resin, although nonimpregnated tape can be used and the resin subsequently impregnated therein during processing.

A structure of the present invention comprising Kevlar ® polyaramid fibers and resin matrix will have a unidirectional tensile modulus of about 10,000,000 psi to about 12,000,000 psi at room temperature. The fiber to resin ratio of a structure of the present invention formed from polyaramid fibers and resin matrix will be about 55% to about 65% by volume.

Graphite fibers may also be used in the practice of this invention. Graphite fibers generally have a tensile strength of about 400,000 psi to about 600,000 psi. The diameter of typically used graphite fibers ranges from about 0.00025" to about 0.00030". Graphite fibers, like polyaramid fibers, are typically used in the form of roving or tape, which is commercially available in various conventional widths. Roving typically comprises about 12,000 fibers. It is preferred to use roving or graphite fibers which are preimpregnated with thermosetting resin, although it is possible to purchase nonimpregnated fibers and to impregnate the fibers with resin matrix prior to winding operations. A preferred graphite fiber is Celion ® brand graphite fibers manufactured by Celanese Chemical Company, New York, N.Y. Additional examples of graphite fibers which can be used in the practice of this invention are T-300 ® Brand graphite fibers available from Union Carbide Corporation, New York, N.Y. and AS-4 ® brand graphite fibers available from Hercules, Inc., Wilmington, Del. The graphite fiber roving or tape usually has a thickness of about 0.012", although thicknesses such as 0.006" are also available. The cured graphite and resin matrix composite should contain about 50% to about 65% by volume of fibers. A structure of the present invention comprising graphite fibers and resin matrix will have a unidirectional tensile modulus of about 18,000,000 to about 25,000,000 psi at room temperature.

Glass fiber material may also be used in the practice of the present invention. The preferred glass fiber is an S-type or E-type which is commercially available pre-impregnated with epoxy resin or nonimpregnated. Pre-impregnated glass fibers are commercially available in the form of fiber roving or tape having conventional widths of, for example, about 0.1" to about 1.0" and thicknesses of, for example, between 0.06" and about 0.0125". The optional thickness and width is related to the size and loading of the structure. The structure of the present invention when formed from a glass fiber and resin matrix will have about 45% to about 60% by volume fiber content. A structure of the present invention comprising glass fibers and resin matrix will have a unidirectional tensile modulus of about 5,000,000 psi to about 7,000,000 psi at room temperature.

The resin matrix will comprise a thermosetting or thermoplastic resin which is capable of bonding to the synthetic fiber. The resin may be organic or inorganic. Typical of the resins which can be used in the practice of this invention are epoxy, polyester, polyimid, and other high temperature crosslinked polymer structures. A particularly preferred resin is American Cyanamid epoxy resin no. 1806, purchased from American Cyanamid Co., Wayne, N.J. This resin is a high strain capacity resin. Examples of commercially available resins include epoxy resin no. 35101-B manufactured by Hercules, Inc., Wilmington, Del.; epoxy resin no. 5143 and epoxy resin no. 1806 manufactured by American Cyanamid Co., Wayne, N.J.; polyimide resin no. E-7178 manufactured by U.S. Polyimide Co., and resin no. E-746 manufactured by U.S. Prolam Corporation. The tape or roving, as previously mentioned, can be used either pre-impregnated with resin or the tape or roving can be impregnated with resin during the winding process by methods known in the art such as by passing the tape through a reservoir of resin solution prior to winding. Another method is a resin transfer molding process wherein resin is injected into the mold and thereby incorporated into the fiber structure. It is preferred in the practice of this invention to use tape or roving which has been pre-impregnated with resin.

Figure 4:
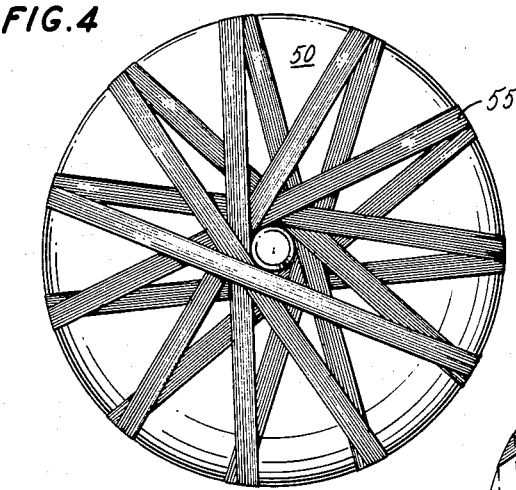
FIG. 4 illustrates a typical winding pattern for a fiber wound torque transmission structure according to the present invention.

The torque drive structures of the present invention are manufactured by using a mandrel and a commercially available automated filament winding apparatus. The mandrel comprises a silicone rubber outer coating and an inner supporting ring consisting of detachable metal sections or segments. The mandrel is placed in a fixture on the winding apparatus and a pre-programed winding pattern is used to wrap the mandrel with the fiber tape or roving to produce a fiber layer or ply of sufficient thickness having appropriate fiber orientation. Although most winding patterns which produce a symmetric and tailored layer of fiber having essentially radial orientation may be used in the practice of this invention, it is preferred to use an eleven circuit advancing winding pattern. FIG. 4 illustrates a basic eleven circuit winding pattern for the torque drive structure. The angle between each tape 55 is approximately 33.2308°. After the eleven circuits are completed the pattern is automatically advanced approximately 5.5385°. After a total of 65 circuits have been wound the pattern is completed and a structural layer of fiber has been wound onto mandrel 50. The tape or roving 55 is wound on mandrel 50 essentially or substantially tangentially to the central hole in the structure.

Composite structures which comprise filament wound resin impregnated resin-fiber matrices appear to have the strength for use as torque drives or couplings for high power, high angular velocity, shaft-misalignment or shaft articultion, and tilting applications. Typically a torque drive for a rotor hub or a power coupling will comprise at least one substantially flat diaphragm having a rim, a central attachment means and a rim attachment means, and reinforcing rings. The composite structures are typically radially wound with resin impregnated fiber on a mandrel so that the fiber orientation is substantially radial at the periphery while tangential to a central hole therein. A problem with a composite wound structure having a flat diaphragm section is that the diaphragm section tends to "oil-can" or displace from the desired uniplanar mode. This problem is attributable to a differential thermal expansion coefficient between the synthetic fiber and the resin. Another problem associated with such a structure is buckling of the structure under torque loading. Buckling is known to reduce fatigue life and torque load handling capacity while contributing to dynamic instability.

Specifically, unidirectional composites have two principal coefficients of thermal expansion, the longitudinal coefficient of expansion $\alpha_L$ in the direction in which the fibers run, and the transverse coefficient of expansion $\alpha_t$ in the direction transverse to the fibers. For a composite material the longitudinal coefficient $\alpha_L$ is usually much smaller than the transverse coefficient $\alpha_t$ because the fibers, which usually have a smaller coefficient than that for the resin matrix, tend to impose a mechanical restraint on the resin matrix material.

With regard to the filament wound diaphragm torque drive, the mix of fiber angles in the wound composite part changes significantly from the center region to the outer radius of the diaphragm section. The center region has a mix of high fiber angles which changes to predominantly radial orientation at the rim. Therefore, in the central portion thermal expansion is dominated by the fiber (having a low coefficient of expansion), while in the rim area, the resin matrix is dominant (having a high coefficient of expansion) in the tangential direction.

As a result, when the part undergoes a temperature change of any kind, the central portion of the diaphragm expands or contracts at a much lower rate than the outer radius or rim section. Such a composite fiber wound structure when cooled down to ambient temperature after a typical high temperature cure will shrink in uneven proportions. In addition, the structure, while in use, will be subject to temperature changes of its environment which may amplify the problem. The outer radius or rim area shrinks at a much greater rate than the central portion of the diaphragm as a result of the fiber angle variation. As a result, the central portion of the diaphragm part is placed in compression with a resulting tendency to buckle or "oil-can" out of the desired uniplanar mode. This is a typical phenomenon in wound composite diaphragms. It is therefore desirable to tailor the fiber orientation of the composite structure to balance the thermal strain properties of the structure.

Since a fiber wound structure used as a torque drive or a power coupling must act as a flexure in addition to transferring torque, it is critical to eliminate or minimize "oil-canning". "Oil-canning" is not desirable for several reasons. First of all, the torque driving capability of a structure is largely dependent on the stiffness of the structure. A structure which exhibits "oil-canning" has reduced torsional stiffness. Secondly, the severity of "oil-canning" is a function of temperature. The variations in temperature that a helicopter torque drive or a power coupling typically encounters ($-65°$ F. to more than $150°$ F.) will cause undesirable variations in torsional stiffness due to the temperature fluctuations. Finally, the "oil-canning" or displacement of the diaphragm section results in nonlinear spring characteristics in the tilt mode. This "oil-canning", when the torque drive or coupling is fastened in place, is observed to cause the diaphragm section to buckle and snap-through in a highly nonlinear fashion. This results in accelerated structural fatigue and subsequent failure. This behavior is also undesirable in a helicopter rotor since it would adversely affect the control characteristics.

In addition to "oil-canning" contributing to buckling, buckling is believed to be attributable to the inherent design of a flexible filament wound torque drive structure wherein a degree of torsional stiffness is sacrificed to permit flexure of the torque drive structure. Buckling is observed to occur in a flexible torque drive structure as a wave-like deformation or series of wave-like deformations emanating outward from the center of the structure in a spoke-like pattern.

Figure 3:
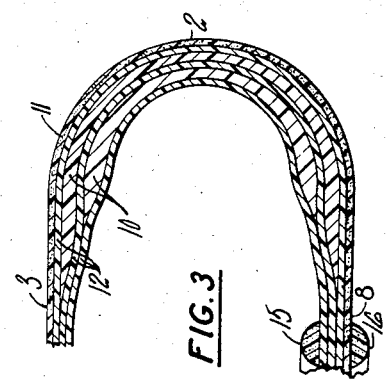
FIG. 3 is a partial cross-section of the fiber wound torque transmitting structure of the present invention.
Figure 5:
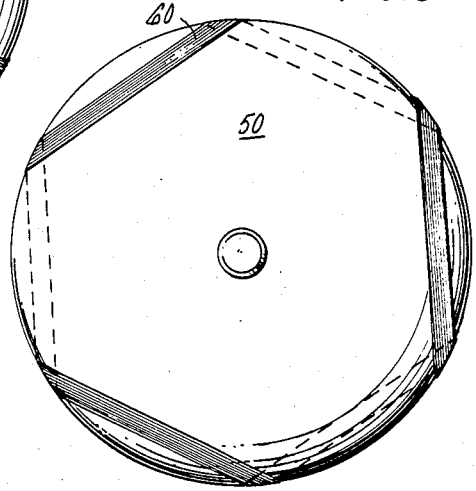
FIG. 5 illustrates an optional 3 circuit winding pattern for rim reinforcement.
Figure 6:
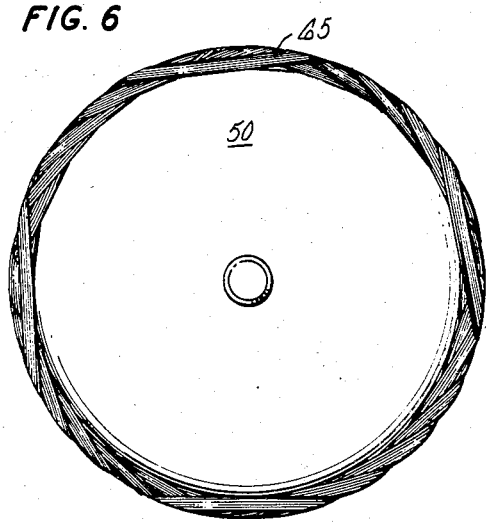
FIG. 6 illustrates an optional 4 circuit winding pattern for rim reinforcement.
Figure 7:
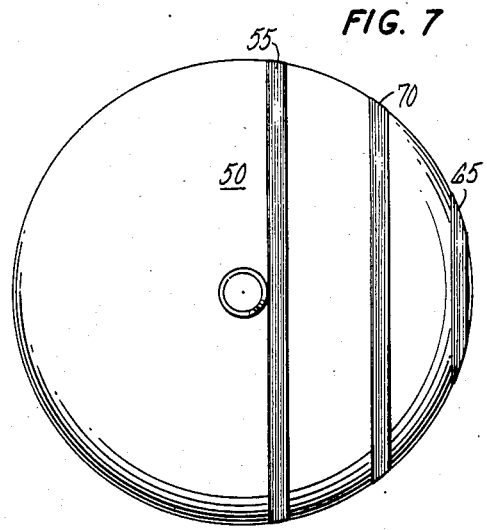
FIG. 7 illustrates optional reinforcing patterns for the structure of the present invention.

The rim reinforcement is incorporated into the torque drive structure of the present invention to eliminate the "oil-canning" phenomenon. The rim reinforcement is a circumferential wrap of fiber (tape or roving) applied in a multicircuit pattern until a complete layer or ply of the fiber has been wound. It is preferred to use fibers such as polyaramid or graphite having a very low or negative coefficient of thermal expansion $a_L$ for the rim reinforcement in order to balance the thermal properties of the structure. The rim reinforcement may be wound before the initial layer of the structure is wound onto the mandrel or after the initial layer or layers have been wound. The rim circumferential reinforcing wrap is illustrated in FIG. 3, FIG. 5, and FIG. 6. FIG. 5 illustrates a three-circuit retreating pattern wherein the rim is wrapped around mandrel 50 with fiber tape 60 in a repeating pattern at somewhat less than 120° intervals to produce a circumferential layer and FIG. 6 is a four-circuit retreating pattern wherein the rim is wrapped around mandrel 50 with fiber tape 65 in a repeating pattern at somewhat less than 90° intervals to produce a circumferential layer. An optional wrap is illustrated in FIG. 7 wherein the reinforcing fibers 70 are wound around mandrel 50 at an angle to and along its radius between the central hole and the outer rim; fiber 55 and fiber 65 are shown for comparison.

The purpose of reinforcing the diaphragm section of the torque drive structure with reinforcing rings is to increase torsional stiffness while at the same time minimizing the increase in the flexural stiffness of the diaphragm structure. This is critical in that increased torsional stiffness is required without increased flexural stiffness in order that the fluxural torque drive structure operate properly. The reinforcing rings may be separately wound on a special mandrel as illustrated in FIG. 11 or may be wound into the diaphragm section itself. The rings may be affixed to either the top or the bottom surfaces of the diaphragm or wound in an interleaving manner into the diaphragm section of the torque drive structure as illustrated in FIGS. 10A, 10B, 10C. It is possible to have reinforcing rings in any combination, for example, on the top and bottom surfaces, on the top surface and interleaved with the diaphragm, etc.

The reinforcing rings are filament wound using a relatively narrow tape or roving. The tape or roving will have a width typically about 0.05 inch to about 1 inch, and more typically about 0.05 inch to about 0.5 inch. The tape or roving will have a thickness of about 0.003 inch to about 0.012 inch, more typically about 0.006 inch to about 0.012 inch. The fibers used to wind the reinforcing rings will comprise the same fibers previously mentioned for use in winding the structure and the reinforcing rim section. It is contemplated that at least one ring will be utilized to reinforce a diaphragm section to improve torsional stiffness, however, more typically several rings will be utilized. The rings will have varying diameters and varying widths depending on the stress concentration at the particular point in the torque drive structure. In addition, the rings may have different thicknesses, also depending on the stress concentration at a particular point from the center of the torque drive structure. It is contemplated that the rings may be co-cured with the torque drive structure in a preferable embodiment, however, it is also possible to cure the reinforcing rings separately from the torque drive structure, and to then attach the reinforcing rings to the cured torque drive structure by bonding, etc.

As previously mentioned, FIGS. 9, 10A, 10B and 10C illustrate various embodiments of the torque drive structures of the present invention having reinforcing rings. The cross section of a reinforcing ring can have a variety of geometric shapes depending on the stress concentrations at a particular point. The varying geometrical configurations are obtained by varying the width of the roving as the ring is wound. For example, cross sections can be produced which are rectangular, square, triangular, or circular in configuration. The reinforcing rings are wound with sufficient tension using a conventional filament winding apparatus on a mandrel as illustrated in FIG. 11. It is also contemplated that the rings may be wound directly onto the mandrel which is used for the winding of the torque drive structure. The rings, although preferably circular, may have other configurations, for example, elliptical, triangular, square, rectangular.

It is critical to wind the fibers with sufficient tension to produce the "non-oil-canning", buckling-resistant structures of the present invention. Typically the winding tension will be about 1,000 to about 10,000 pounds per square inch, preferably about 5,000 pounds per square inch.

The number of structural layers, the number of rim reinforcing layers, and the size and number of reinforcing rings comprising any particular torque drive structure will depend upon the size of the structure, the load, angular velocity and the degree of tilt or articulation during tilt. Preferably more than one structural layer is provided, at least one rim reinforcing layer is provided, and at least one reinforcing ring is provided. The rim reinforcement layers and the structural layers, as well as the reinforcing rings, may be wound in any order or combination. In an example of a particular embodiment, resultant rim reinforcement layers 10 are optionally interleaved with the structural layers 12 as illustrated in FIG. 3. After the winding is completed, additional fabric reinforcement 11 may be optionally applied to the outer surface of the structure to reinforce the structure for mounting as in FIG. 3.

The fabric will typically comprise woven glass fiber, Kevlar ® or graphite fiber. A preferred fabric is woven Kevlar ® 49 brand woven cloth having a thickness of about 0.012". The fabric is preferably preimpregnated with resin, although the fabric can be impregnated with resin during processing as previously discussed with regard to fibers.

The segmented mandrel wrapped with fiber and resin matrix is then cured in a molding machine under sufficient heat and pressure and for a sufficient time period to cure the resin matrix and provide the desired shape to the structure. Upon cooling, the back portion of the structure is optionally cut out to form a rim mounting means so that a mounting flange remains when used in a helicopter hub torque drive. When used as a torque drive coupling the back side will not be cut out to form the flange, and both sides of the resulting structure will be similar or identical. The segmented metal mandrel is disassembled and removed and the rubber covering is pulled out. The structure is then optionally drilled around the central attachment means such as a central hub, hubs, and/or around the flange of the rim or anywhere in the structure to receive fasteners or members. By drilling is meant any material removal process such as drilling, punching, burning, etc. In addition, the holes may be wound into the structure by locating projections on the mandrel surface. Typically, the curing cycle used for the structures is a step type cycle in which the temperature is stepped-up at about 2° per minute up to 350° F. The structure is then maintained at 350° F. for about 2 hours and then cooled off at a rate of 2° per minute to room temperature. It is also optional to cure at a temperature of about 250° F. The pressure applied to the part during the cure cycle is typically about 50–300 psi , and preferably about 75 psi . The molding apparatus which can be used to cure and mold the structures of the present invention is typical of heat and pressure molding machines those known in the art and comprises a heated cavity shaped to the surfaces of the structure and a means for applying pressure.

The fiber volume fraction of the molded structure after cooling will be about 55% to about 65% by volume.

The thickness distribution of the wound and molded structure is sufficient to provide acceptably uniform stress approximately throughout the entire part. Typically, the thickness of the structure is highest near the central attachment means, and lower in the diaphragm and higher in the rim.

An embodiment of the torque drive structure of the present invention for use in a helicopter hub assembly is illustrated in FIG. 1. The structure comprises a diaphragm section 8 having a rim 2 and an inward turning flange 3. The structure has a central hole therethrough 4 for receiving a shaft. The structure has holes 6 for receiving control rods and holes 5 for attaching the structure to a shaft. The structure has holes 7 in flange 3 for attachment. The structure has reinforcing ring 15 attached to the diaphragm.

The structural layer 12 is shown with reinforcing layer 10 and cloth reinforcement 11. The reinforcing rings 15 and 16 are shown attached to the upper and lower surfaces of the diaphragm 8.

Figure 2A:
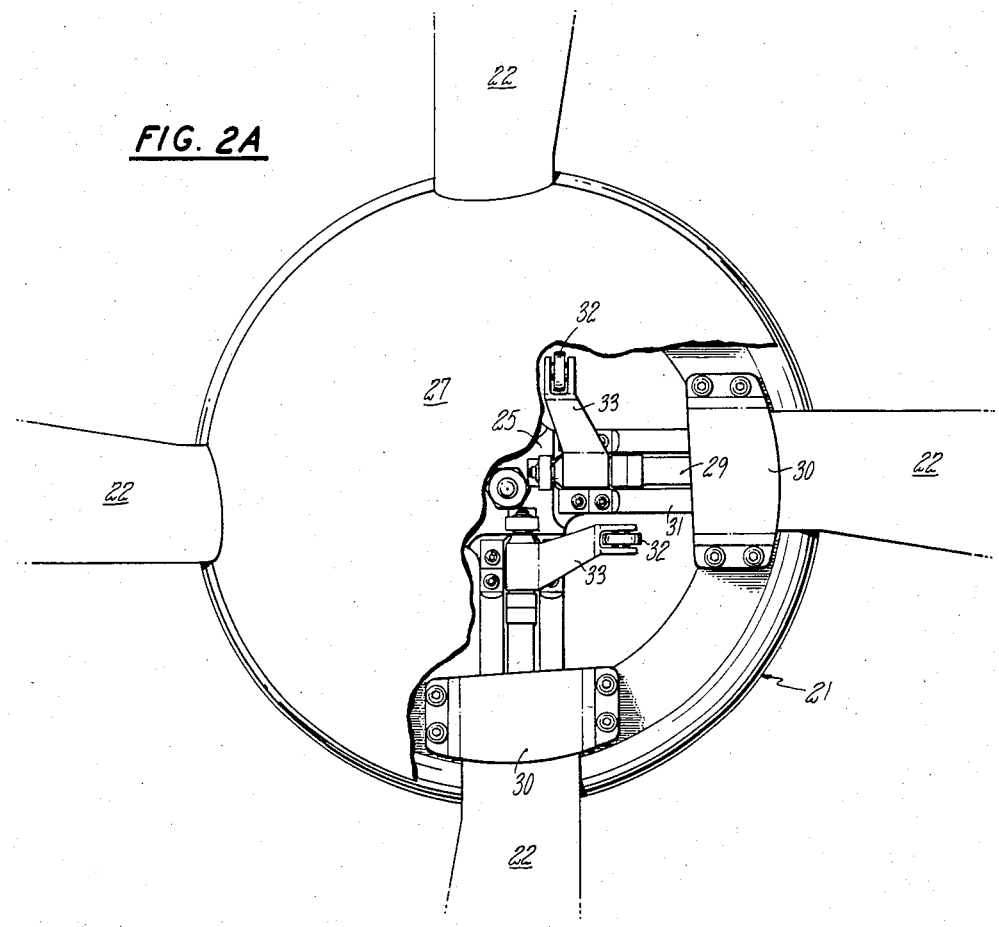
FIG. 2A is a plan view of a partial schematic of a typical composite helicopter rotor hub assembly incorporating the torque drive structure of the present invention.
Figure 2B:
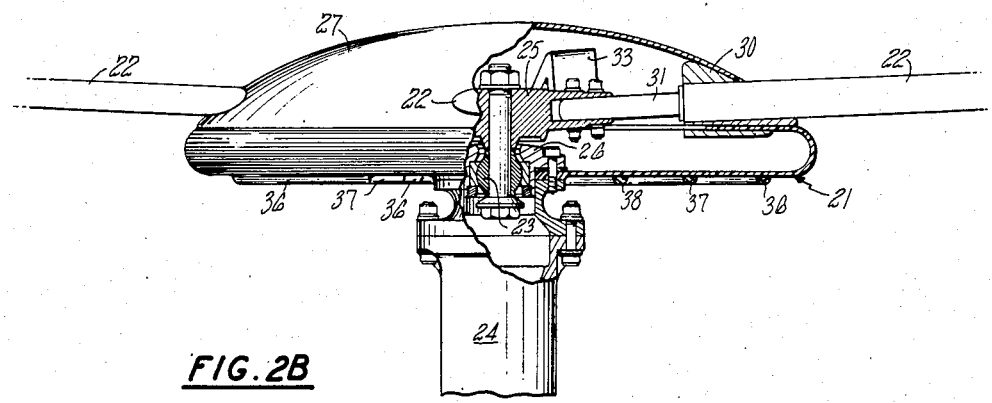
FIG. 2B is a side view of a cross section of the rotor hub assembly.

The use of the structure as a torque drive diaphragm in the rotor of rotary wing aircraft such as a helicopter is demonstrated in FIG. 2A and FIG. 2B. Rotor shaft connector 24 is connected to and drives torque drive diaphragm 21. Torque drive diaphragm 21 is connected by clamp 30 to rotor blade 22. Rotor blade 22 has integral with it flex beam 31 and torque tube 29. Blade pitch is controlled by push rod 32 acting on pitch arm 33 to turn torque tube 29. Flex beam 31 twists to permit the blade to change pitch during normal operation of the rotor. Gimbal bearing 23 permits the rotor hub to tilt about rotor shaft 24 as a result of various pitch angles applied to the blade 22. Cover 27 protects the rotor and provides an aerodynamic profile. It can be seen from FIG. 2A and 2B that torque drive diaphragm 21 connects the shaft to the blades thereby driving torque to the blades, whereas rotor hub 25 and gimbal bearing 23 restrain the blades from centrifugal force and permit the hub to tilt. As rotor hub 25 tilts, torque drive 21 must also tilt. Tilt stop 26 controls the maximum degree of tilt. The torque drive 21 has the reinforcing rings 36, 37 and 38 mounted thereto.

Figure 8:
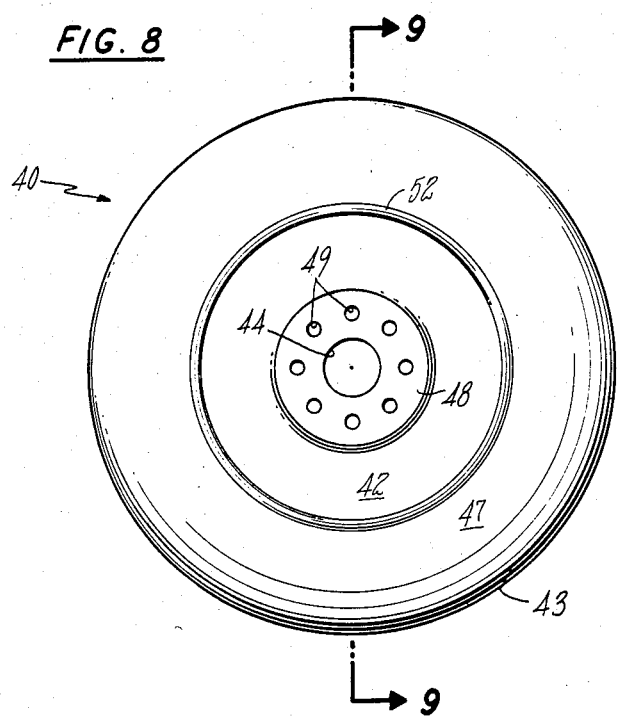
FIG. 8 illustrates a coupling using the torque drive structure of the present invention.
Figure 9:
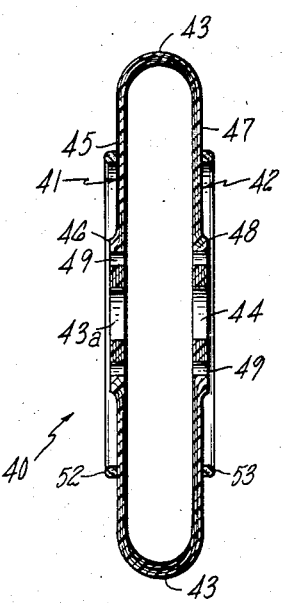
FIG. 9 is a sectional view of a coupling using the torque drive structure of the present invention.

An embodiment of the present invention for use as a power coupling (e.g., the output shaft of a transmission powering the shaft of a machine, or the output shaft of an electric motor powering a centrifugal pump) is illustrated in FIG. 8 and FIG. 9.

The structure 40 comprises a hollow disc having a first substantially flat side 41 and a second parallel substantially flat side 42. Integral rim 43 connects flat side 41 with flat side 42. Flat side 41 has central hole 43a therethrough for receiving a first shaft. Flat side 42 has central hole 44 therethrough for receiving a second shaft. Flat side 41 has substantially flat diaphragm section 45 extending from hub section 46 to rim 43. Flat side 42 similarly has diaphragm section 47 extending from hub section 48 to rim 43. Hub sections 46 and 48 optionally have holes 49 therethrough for attachment. The substantially flat side 41 has a reinforcing ring 52 attached thereto and the substantially flat side 42 has a reinforcing ring 53 attached thereto.

The structure 40 may optionally have rim 43 longitudinally extended to comprise a cylindrical or tapered shape. This is accomplished by changing the shape of the mandrel.

The optional interleaving of the reinforcement fibers with the tangentially wound fibers in the rim section of the structure is illustrated in FIG. 3. Diaphragm or structural layers 12 are seen to be interleaved with rim reinforcing fibers 10. Optional fabric reinforcement 11 is also illustrated.

FIG. 10A illustrates the diaphragm 8 having the reinforcing rings 36a and 38a attached to the inner surface; the reinforcing rings 36a and 38a are shown attached to the bottom and top surfaces of the diaphragm 8 in FIG. 10C. FIG. 10B illustrates the rings 36a and 38a interleaved with the diaphragm 8. A filament winding spool 80 for winding a reinforcing ring 98 is illustrated in FIG. 11. The spool 80 comprises a rotatable shaft 86, a first disassemblable side pieces 88 and a second disassemblable side piece 90, and an inner member 94. The spool 80 is disassembled to remove the ring 98.

The torque drive structures of the present invention may contain holes or voids therethrough for receiving fasteners, control rods, etc. The holes may be incorporated by conventional methods such as drilling, punching, burning, etc. The holes may also be "wound-in" by having projections on the mandrel surface about which the fiber is wound thereby resulting in areas of the structure void of fibers.

The torque drive structures of the present invention have a general use in coupling a high speed, high torque angularly rotating shaft to a second angularly rotating shaft, member or members, or assembly for the purpose of powering that shaft or driving the member or members, or assembly. One shaft may have its central longitudinal axis skewed or articulated up to about 10° with respect to the central longitudinal axis of the other shaft or assembly. When used as a coupling, rather than as a torque drive in a helicopter rotor assembly, the torque drive structure will be adapted to receive a shaft on both the front and back sides. The method of manufacture will be similar to that previously described, except that the back face will not be cut to form a flange, but will be wound and cured to form a hub section with a central hole therethrough for receiving a shaft, so that the structure would be attached on each side to a shaft to function as a flexible torque drive coupling and each side would have a hub section and a hole therethrough.

EXAMPLE

An approximately one-sixth scale fiber wound torque drive structure for use in a composite helicopter hub was manufactured by winding Kevlar 29 ® brand polyaramid fiber around a mandrel. The mandrel comprised an inner disassemblable segmented metal ring and an outer silicone rubber coating.

A single layer of 0.55 inch wide Kevlar 29 ® brand roving was initially wound around the rim of the mandrel in a 7 circuit retreating pattern to form the rim reinforcement. Then a single layer of tape was wound about the mandrel in an eleven circuit pattern to form the structure. The tape was Kevlar 29 ® brand polyaramid fiber tape having a thickness of about 0.006". The tape was about 0.5" wide and comprised nine individual fiber rovings. The tape was impregnated with an American Cyanamid epoxy resin matrix (experimental) no. 1806 having a high strain capacity. The tape was acquired from American Cyanamid Co., Wayne, N.J. The fiber tension during winding was set at about 5,000 pounds per square inch. Fiber reinforcing rings were manufactured by Sikorsky Aircraft (Stratford, Conn.). The rings had diameters of 7.75 inches, 5.25 inches. The fiber was a graphite fiber roving, preimpregnated with 5225 resin matrix manufactured by American Cyanamid Co. (Wayne, N.J.). The roving was 0.055 inch wide and 0.006 inch thick. The rings were 0.25 inch wide, and 0.055 inch thick. The rings were incorporated into the structure by post curing with FM 300 adhesive available from American Cyanamid (Wayne, N.J.). Kevlar ® 29 polyaramid woven fabric was then wrapped around the rim section. The fabric was preimpregnated with the same resin matrix. The fabric had a thickness of 0.009 inch. The mandrel and wound structure were placed in a molding machine and the structure was cured by molding at a pressure of about 75 psi with a step-type temperature cycle wherein the temperature was stepped-up at about 2° per minute to about 350° F., maintained at 350° F. for about 2 hours, and cooled down at about 2° per minute to room temperature. The structure was drilled around the central hub and the flange to receive fasteners. The back face of the structure was cut to form a flange and the mandrel and covering were removed. The structure had a radius of 5.08", and a central inner hole having a diameter of 1.05". The structure had a thickness at the hub of about 0.15" and a thickness at the rim of 0.012". The overall depth of the structure was about 0.80".

The structure was mounted in a simulated 1/6 scale helicopter hub assembly test apparatus and rotated at an angular velocity of about 1,500 rpm (revolutions per minute) for about 21 million cycles at angles of up to 8° with no structural failure. No "oil-canning" was observed. No buckling was observed.

The composite torque drive assemblies of the present invention provide a means for coupling a rotating drive shaft supplying power at high torque and high angular velocity to a second driven shaft or assembly wherein the longitudinal central axis of the shafts, or shaft and assembly, can be articulated up to about 10° from each other. The torque drive assemblies are constructed of wound synthetic fibers and resin matrix. The multiple angle winding patterns typically used produce predominantly radial fiber orientation in the peripheral sections of such a structure. The varying temperatures experienced by these structures in a typical application result in differential rates of thermal expansion, particularly at the rim where the epoxy matrix dominates in the tangential direction. The result is an "oil-canning" phenomenon wherein the normally flat diaphragm takes on a concave or convex shape when unconstrained. When constrained, the diaphragm buckles, resulting in nonlinear spring characteristics and premature failure. It has been found according to the present invention that by incorporating substantially tangential reinforcing fibers in the rim, or optionally throughout the structure, the "oil-canning" phenomenon is eliminated, thereby producing a thermally stable structure which can be used as a high torque, high angular velocity, flexible torque drive.

In addition, the flexural requirements of a flexible torque drive structure can result in buckling of the structure under high torque loads, the incorporation of filament wound fiber reinforcing rings into the structures eliminates or substantially reduces buckling, thereby improving service life, fatigue resistance and dynamic stability.

Although this invention has been shown and described with respect to detailed embodiments thereof, it will be understood by those skilled in the art that various changes in form and detail thereof may be made without departing from the spirit and scope of the claimed invention.

I claim:

1. A fiber reinforced resin matrix composite structure, particularly adapted for use as a torque drive diaphragm in a rotary wing aircraft hub, comprising a circular diaphragm having a rim, said rim having an attachment means, said diaphragm having at least one reinforcing ring and a central attachment means on the diaphragm, wherein the structure comprises:

a resin matrix;

fibers, wound with sufficient tension substantially tangentially to said central attachment means in a multiple circuit pattern to form a diaphragm having a rim and a rim attachment means:

reinforcing fibers wound with sufficient tension in an essentially circumferential manner to reinforce the rim section of said structure, and at least one reinforcing ring formed from wound fibers, the center of said ring concentric with the diaphragm, wherein the structure is cured by molding at sufficient heat and pressure such that the diaphragm section of the structure remains essentially uniplanar when subjected to stresses induced by temperature changes, and the structure is resistant to buckling under torque loads.

2. The structure of claim 1 wherein the fiber is selected from the group consisting of glass fiber, graphite fiber, polyaramid fiber and combinations thereof.

3. The structure of claim 2 wherein a resin impregnated woven synthetic fabric cloth is wrapped around all or part of the wound structure prior to curing.

4. The structure of claim 3 wherein the woven synthetic fabric cloth comprises a fiber selected from the group consisting of glass fiber, graphite fiber, polyaramid fiber, and a combination thereof.

5. The structure of claim 1 additionally comprising a plurality of holes therethrough radially beyond the outer periphery of the central attachment means for receiving rods and fasteners.

6. The structure of claim 1 wherein the fiber is wound at a tension of about 5,000 psi.

7. The structure of claim 1 additionally comprising a centrally located hole therethrough for receiving a shaft.

8. The structure of claim 1 wherein the rim attachment means comprises an inward turning flange.

9. A fiber reinforced resin matrix composite structure, particularly adapted for use as a flexible torque drive coupling, comprising a hollow disc having a first substantially flat diaphragm side and a second substantially flat diaphragm side, each diaphragm side having a central attachment means and each diaphragm side having at least one reinforcing ring concentric with the axial central axis of the disc, said disc having a peripheral rim joining said diaphragm sides, wherein the structure comprises:

a resin matrix;

fiber, wound with sufficient tension substantially tangentially to the central attachment means in a multiple circuit pattern to form the disc;

fiber wound with sufficient tension in an essentially circumferential manner to reinforce the peripheral rim of said structure; and, fiber wound with sufficient tension in a substantially circular manner to form reinforcing rings on or in the diaphragm sides and concentric therewith, the structure being cured by molding with sufficient heat and pressure such that the diaphragm sides of the structure remain essentially uniplanar when subjected to stresses induced by temperature changes, and the structure is resistant to buckling under torque loads.

10. The structure of claim 1 or 9 wherein the central attachment means comprises a hub formed by molding during the curing process.

11. The structure of claim 9 wherein the fibers are selected from the group consisting of glass fiber, graphite fiber, polyaramid fiber and a combination thereof.

12. The structure of claim 9 further comprising woven fiber cloth wrapped about at least part of the exterior surface prior to curing.

13. The structure of claim 9 wherein the fiber cloth comprises fiber selected from the group consisting of glass fiber, graphite fiber and polyaramid fiber.

14. The structure of claim 9 additionally comprising a plurality of holes therethrough radially beyond the outer periphery of the central attachment means for receiving members and fasteners.

15. The structure of claim 9 wherein the tension is about 5000 psi.

16. The structure of claim 9 having a central hole therethrough for receiving a shaft.

17. The structure of claim 9 wherein the reinforcing rings and the rim reinforcing fibers are optionally interleaved with the tangential fibers.

18. The structure of claim 1 wherein the rim is extended longitudinally to form a hollow cylinder.

* * * * *